United States Patent [19]
McHenry

[11] Patent Number: 5,533,859
[45] Date of Patent: Jul. 9, 1996

[54] ROLL HANDLING APPARATUS

[75] Inventor: Earl E. McHenry, Blissfield, Mich.

[73] Assignee: Automatic Handling, Inc., Erie, Mich.

[21] Appl. No.: 261,711

[22] Filed: Jun. 17, 1994

[51] Int. Cl.⁶ ..................................................... B25J 5/00
[52] U.S. Cl. .......................... 414/772; 414/754; 414/911
[58] Field of Search .................................. 414/416, 743, 414/754, 771, 772, 773, 776, 778, 907, 910, 911

[56] References Cited

U.S. PATENT DOCUMENTS

| | | | |
|---|---|---|---|
| 2,232,045 | 2/1941 | Berthold et al. | 414/754 |
| 2,426,569 | 8/1947 | Stewart | 414/754 |
| 3,021,018 | 2/1962 | Paxson | 414/754 |
| 4,018,351 | 4/1977 | Stobb | 414/754 |
| 4,367,059 | 1/1983 | Stubbins | 414/911 |
| 4,432,689 | 2/1984 | Shell | 414/416 |
| 5,244,330 | 9/1993 | Tonjes | 414/754 |
| 5,324,097 | 6/1994 | Decap | 298/35 M |

FOREIGN PATENT DOCUMENTS

| | | | |
|---|---|---|---|
| 596520 | 3/1978 | U.S.S.R. | 414/778 |
| 757422 | 8/1980 | U.S.S.R. | 414/778 |
| 1212901 | 2/1986 | U.S.S.R. | 414/778 |

Primary Examiner—Michael S. Huppert
Assistant Examiner—Gregory A. Morse
Attorney, Agent, or Firm—Emch, Schaffer, Schaub & Porcello

[57] ABSTRACT

A roll handling apparatus for aligning and upending a plurality of rolls is disclosed. A C-hook is mounted on a vertical lifting arm. An elevated rail defines a path of travel for a travelling support which mounts the vertical lifting arm. A tiltable upender assembly is positioned adjacent the elevated rail and includes a deck assembly, opposed gates positioned on opposite sides of the deck assembly and a pivotable rear carrier assembly extending between the opposed gates. Lift cylinders are provided for tilting the deck assembly for correct alignment of the rolls. Pivot cylinders are provided for rotating the deck assembly and the carrier assembly ninety degrees to upend the correctly aligned rolls.

24 Claims, 7 Drawing Sheets

ROLL HANDLING APPARATUS

BACKGROUND OF THE INVENTION

The present invention is directed to roll handling apparatus and, more specifically, to a roll handling apparatus which allows an operator in a roll converting industry to quickly and easily transport and sort rolls from production to, for example, a pallet.

Various materials, such as paper and soft metals, are slit and placed on rolls at a roll converting station. It has been found that the materials within the rolls are sometimes damaged if, for example, the rolls are rolled on their circumference. A common delivery system for the rolls is to vertically align them in groups on a pallet and then transport the pallets to remote locations, where the individual rolls are removed and utilized. It is important that the rolls be quickly and accurately vertically aligned.

SUMMARY OF THE INVENTION

The present invention is directed to a roll handling apparatus which includes an elevated support rail which extends from the slitter/winder location to a palletizing location. A C-hook assembly, for example, a prior art Automatic Handling/Bucon Levomat unit, is mounted for movement along the support rail. The C-hook assembly includes a travelling support mounted for movement along the rail. A vertically movable lifting arm extends downwardly from the travelling support and a C-shaped lifting hook is mounted adjacent the lower end of the lifting A tiltable upender assembly is positioned adjacent one end of the support rail. The upender assembly includes a support deck. Opposed gates are positioned adjacent the opposite sides of the deck and a pivotable carrier assembly extends generally between the opposed gates. A lift mechanism is provided for tilting the deck such that one side of the deck is higher than the other side. A pivot cylinder is provided for pivoting the carrier assembly and the deck. This moves the rolls which have been positioned on the deck through a 90° rotation and aligns them in a correct vertical position.

BRIEF DESCRIPTION OF THE DRAWINGS

FIG. 5 is a fragmentary end view of a portion of the upender shown in FIG. 2;

DETAILED DESCRIPTION OF THE PREFERRED EMBODIMENT

Figure 1:
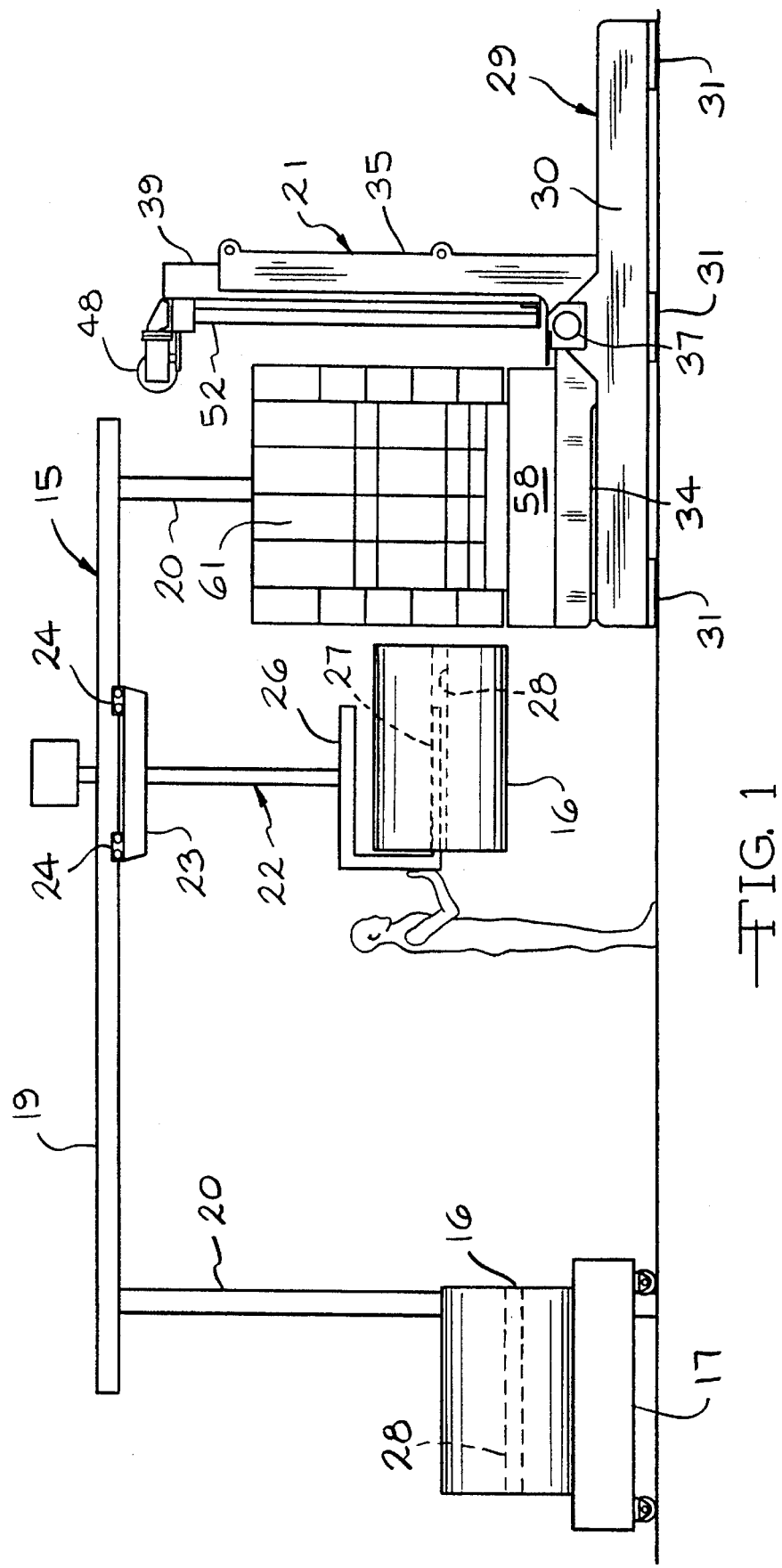
FIG. 1 is an elevational view showing the roll handling apparatus, according to the present invention.

A roll handling apparatus, according to the present invention, is generally indicated by the reference number 15 is FIG. 1. Rolls, in this embodiment paper rolls 16, are positioned on a cart 17 at the location where the slit rolls are discharged from the slitter/winder station. While the rolls 16 in the present embodiment are paper rolls, other types of rolls or rolled materials may also be handled by the roll handling apparatus 15, according to the present invention. In addition to paper, the rolled material may be malleable metals or plastic films.

It has been found that improper handling of the rolls 16, for example rolling the rolls 16 on their circumference, often result in product damage. The roll handling apparatus 15 provides a simple, fast sorting and palletizing process which eliminates product damage and also minimizes the labor required.

The roll handling apparatus 15 includes an elevated support rail 19 which is mounted on vertical support frames 20. The support rail 19 generally extends between the cart 17 at the slitter/winder location and a tiltable upender assembly 21, which is a part of the present invention. The roll handling apparatus 15 includes a C-hook assembly 22. The C-hook assembly 22 is of a prior art design, for example, an Automatic Handling/Bucon Levomat Unit. The hook assembly 22 includes a travelling support 23 having wheel units 24 which are carried by the elevated support rail 19. A vertically movable lifting arm 25 extends downwardly from the travelling support 23. A C-shaped lifting hook 26 is mounted adjacent the lower end of the lifting arm 25. The C-hook 26 includes a probe 27 which is mounted within the central opening 28 of a roll 16.

Figure 2:
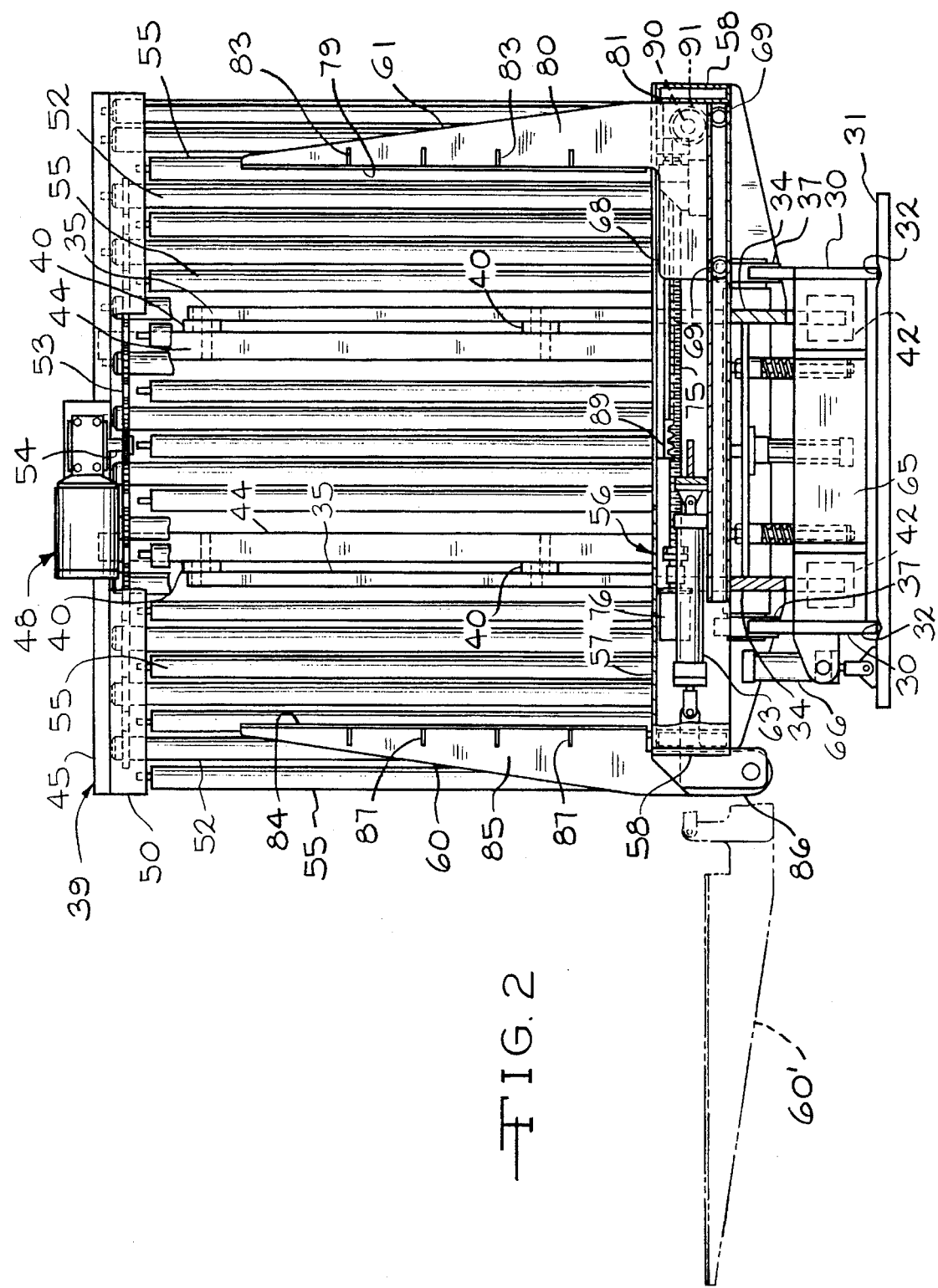
FIG. 2 is an end view showing the upender assembly, according to the present invention.

Referring to FIGS. 1–4, the tiltable upender assembly 21 includes a base unit 29 having a pair of opposed side frame members 30 which rest on transverse supports 31. Referring to FIG. 2, the transverse supports 31 include "V" slots which receive the side frame members 30. The upender assembly 21 includes a pair of generally "L-shaped" support members 33 having perpendicular legs 34 and 35. The L-shaped support members 33 are pivotally connected by opposed pivot shafts 37 to the side frame members 30 (see FIG. 3). A rear carrier assembly 39 is mounted by a plurality of links 40 to the legs 35 of the L-shaped support members 33. Link cylinders 41 are connected to the links 40. Actuation of the link cylinders 41 provides relative motion between the legs 35 and the rear carrier assembly 39 to move the carrier assembly 39 away from the pivot shaft 37.

A pair of cylinders 42 are operatively connected between the L-shaped support members 33 and the side frame members 30. The cylinders 42, when retracted, pivot or rotate the rear carrier assembly 39 downwardly to the dashed line position 39' indicated in FIG. 3.

The rear carrier assembly 39 includes a pair of main frame members 44 which are connected by the links 40 to the opposed legs 35 of the L-shaped support members 33. A longitudinally extending flange member 45 is mounted on the main frame members 44 at their upper ends and an angle member 46 is mounted on the main frame members 44 at their lower ends (see FIG. 3). A motor and gear reduction assembly 48 is mounted on the flange member 45. A support box 50 is mounted below the flange member 45 adjacent the upper ends of the main frame members 44. A plurality of driver rollers 52 are mounted for rotation between the flange member 45 and the lower angle member 46. The drive rollers are driven by a drive chain 53, which in turn is driven by the output shaft 54 of the motor and gear reduction assembly 48. A plurality of idler rollers 55 extend between the support box 50 and the lower angle member 46. The idler rollers 55 are generally interposed between adjacent ones of the drive rollers 52.

Referring to FIG. 2, a deck assembly 56 including an upper deck 57 is fixably mounted on the legs 34 of the L-shaped support members 33. The deck assembly 56 includes a plurality of channel box members 58 which define the outer perimeter of the deck assembly 56 and which support the rectangular deck 57.

A series of cross plates 65 extend between the side frame members 30 and pivotally mount a pair of lift cylinders 66 (see FIG. 2). The lift cylinders 66 are positioned adjacent the pivoting gate 60 below the deck assembly 56. Extension of the lift cylinders 66 lift the deck assembly 56 to the tilted position shown in FIG. 8.

Opposed gates 60 and 61 are positioned adjacent opposite sides of the deck assembly 56. The gate 60 is pivotally mounted to the deck assembly 56 and is operatively connected to a pair of pivot cylinders 63. Extension of the pivot cylinders 63 move the gate 60 between the solid line position, shown in FIG. 2, and the dashed line position 60'.

Figure 3:
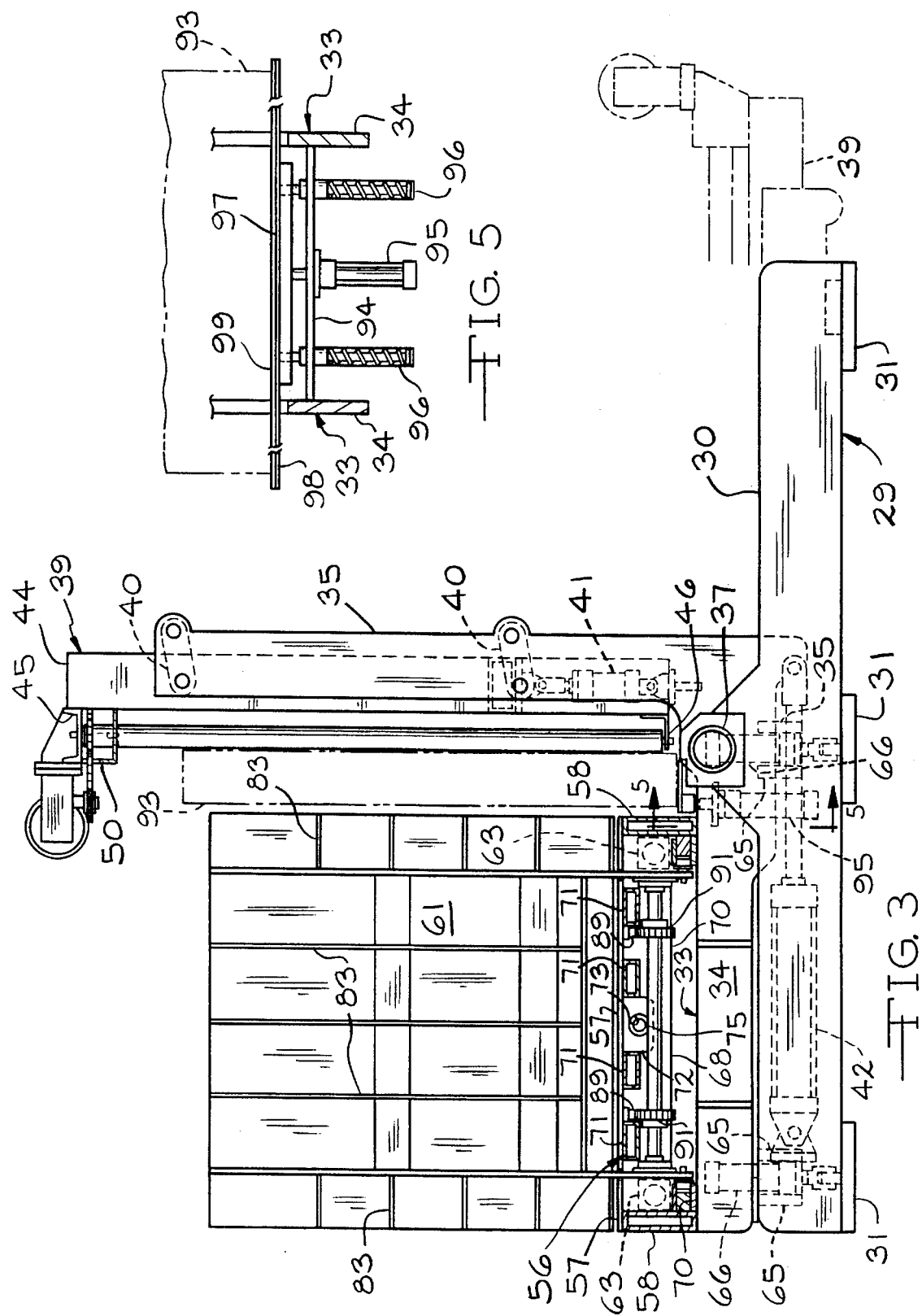
FIG. 3 is an elevational view showing the upender assembly of FIG. 2.
Figure 4:
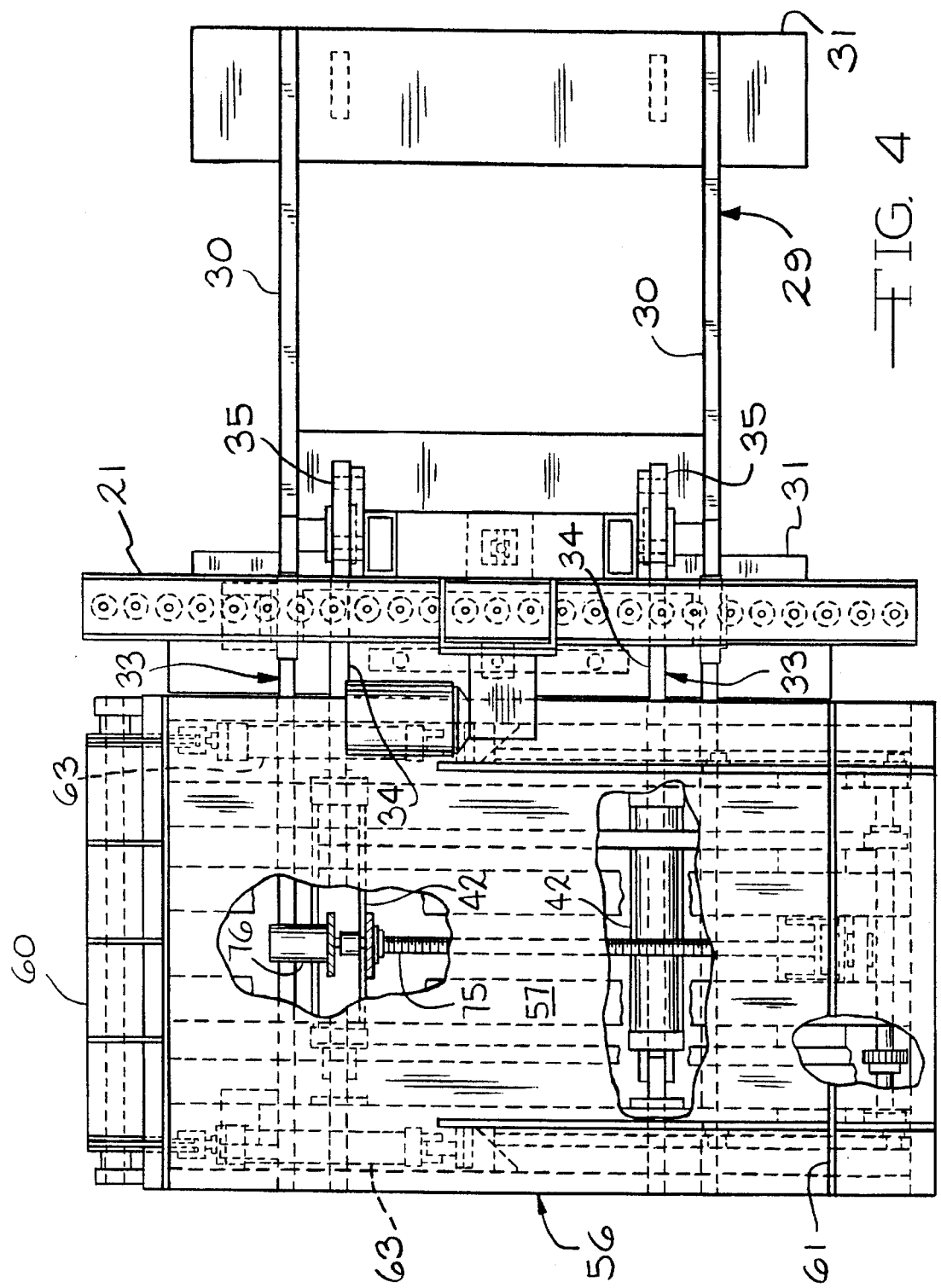
FIG. 4 is a plan view of the upender assembly shown in FIG. 2.

Referring to FIG. 2, the movable gate 61 is mounted on a travelling carriage 68. The carriage 68 includes outwardly extending shafts which mount roller assemblies 69. The channel box members 58 mount a pair of guide plates 70 which support and define a path for the roller assemblies 69 of the carriage 68. Referring to FIG. 3, the deck assembly 56 includes a plurality of support members 71 which mount and support the deck 57. A drive block 72 having a threaded opening 73 is mounted adjacent the right end of the deck assembly 56, as viewed in FIG. 2. The drive block 72 is mounted between adjacent pairs of the support members 71. Referring to FIG. 2, a threaded shaft 75 extends through the center of the deck assembly 56 and is received by the threaded opening 73 of the drive block 72. A drive motor 76 is operatively connected to the threaded shaft 75. The drive motor 76 is a reversible motor. Operation of the motor acting through the threaded shaft 75 and through the drive block 72 moves the carriage 68 and the movable gate 61 toward and away from the opposed gate 60. Referring to FIG. 2, the gate 61 includes a front plate 79 which is supported by a pair of wings 80 having lower ends 81 which extend through slots in the deck 57. The ends 81 are mounted on the carriage 68. The gate assembly 61 also includes a plurality of ribs 83 which are located between the wings 80. Similarly, the pivotable gate 60 also includes a front plate 84 extending between opposed wings 85. The wings 85 include lower ends 86 which are pivotally connected to the respective rods of the pivot cylinders 63. The pivotable gate assembly 60 also includes a plurality of reinforcing ribs 87 which are located between the wings 85.

Referring to FIGS. 2 and 3, in the present embodiment, a pair of opposed racks 89 are mounted below the deck 57. A transverse shaft 90 of the carriage 68 mounts a pair of opposed pinions 91 which mate with the respective racks 89. The racks ensure that the carriage 68 and the attached movable gate 61 move along a predetermined path.

Referring to FIG. 3, a pallet 93 is indicated by dashed lines. As best shown in FIG. 5, a pallet support plate 94 is mounted between the legs 34 of the L-shaped support members 33. A pallet cylinder 95 and a pair of return spring assemblies 96 are mounted by the support plate 94. The rods of the pallet cylinder 95 and return spring assemblies 96 in turn mount a carrier plate 97 which mounts and supports a pallet deck 98. The pallet deck 98 includes an upper gripper surface layer 99.

Figure 6:
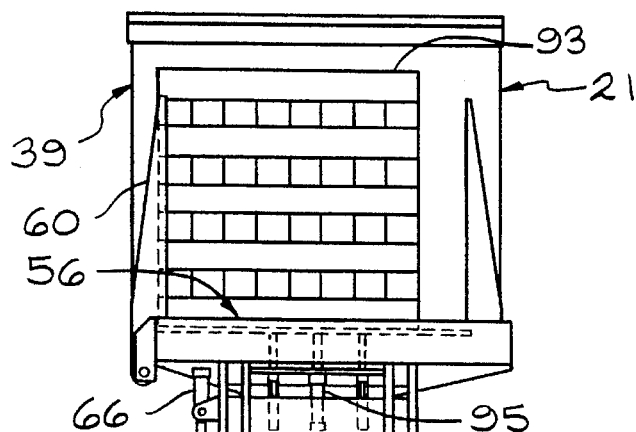
FIG. 6 is a partial diagrammatic end view of the upender assembly, according to the present invention, with a pallet positioned on the upender assembly.

Referring to FIG. 1 and FIGS. 6–14, in a typical operation, the operator uses the C-hook assembly to remove an individual roll 16 from the cart 17. The travelling support 23 moves along the elevated support rail 19. During this period, if desired, the operator can sort the rolls by size and also label the rolls. Prior to placing a roll 16 in the tiltable upender assembly 21 the view, as seen by the operator, is shown in FIG. 6. The pallet 93 has been placed in position against the rear carrier assembly 39. The pallet cylinder 95 has been actuated to move the pallet 93 to its FIG. 3. The lift cylinder 66 has been retracted to move the deck assembly 56 to its horizontal start position. The gate 60 has been pivoted upwardly to define a side of the roll receiving opening.

Figure 7:
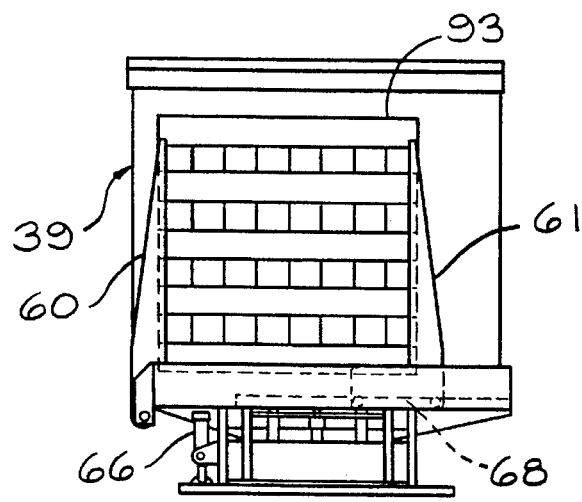
FIG. 7 is a view similar to FIG. 6 showing the movable gate positioned inwardly.

Referring to FIG. 7, the drive motor 56 is energized and the carriage 68 together with the attached movable gate 61 is moved to the left to form the other side of the roll receiving opening.

Figure 8:
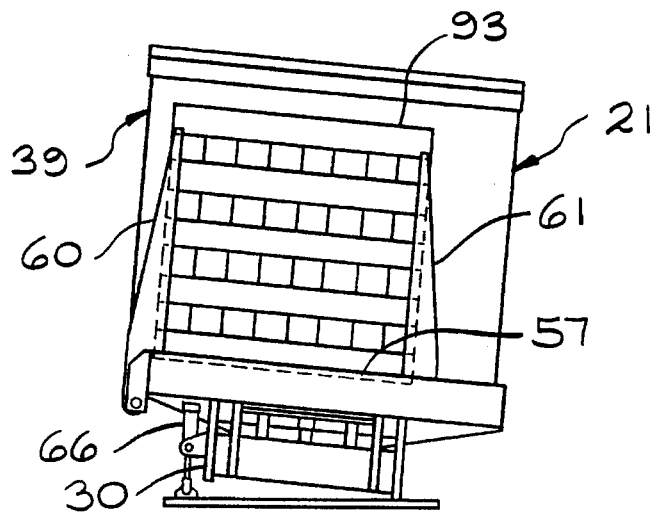
FIG. 8 is a view similar to FIG. 6 showing the deck tilted prior to receiving rolls.
Figure 9:
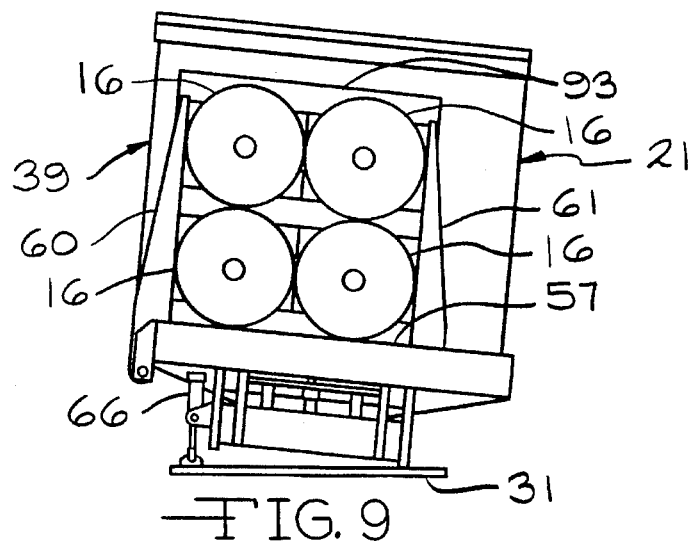
FIG. 9 is a view similar to FIG. 6 showing rolls positioned on the deck between the opposed gates and adjacent the pallet.

Referring to FIG. 8, the lift cylinders 66 are then extended to tilt the upender assembly 21. Referring to FIGS. 2 and 8, when the tilting occurs, the left hand side frame member 30 is moved upwardly, with the right hand side frame member 30 pivoting in the V-shaped slot 32.

Using the tiltable upender assembly 21 greatly facilitates the proper positioning of the rolls 16 in their desired alignments on the pallet 93. The force of gravity moves the initial paper roll unit 16 to the lower right hand corner. The next paper roll unit is placed to the left and gravity urges this paper roll 16 into a correctly aligned tight position with the first roll 16. Next, the upper right hand paper roll 16 is positioned and again, because of the tilted deck 57, urges the third unit to the right and downwardly. Lastly, the fourth roll 16 is placed in the remaining slot, again being urged downwardly by gravity. Paper rolls of various diameters and numbers can be placed within the tiltable upender assembly 21, according to the present invention. The stacking is not limited to the four roll design or the geometrical pattern shown in FIG. 9.

Figure 10:
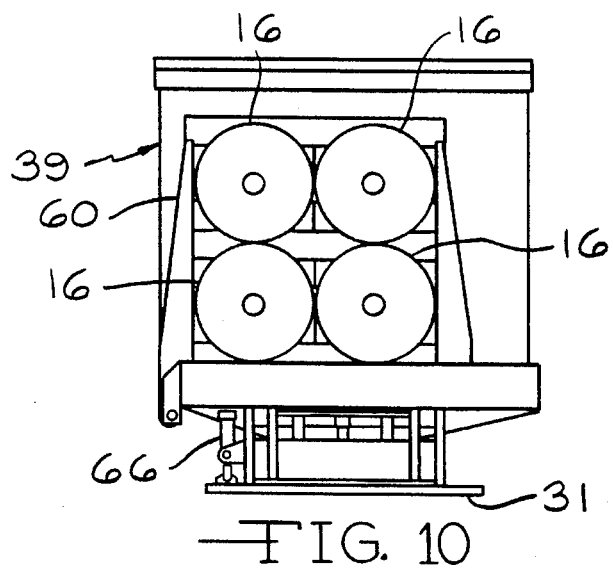
FIG. 10 is a view similar to FIG. 9 showing the deck returned to a horizontal position.

After the stacking of the rolls 16 is completed, the lifting cylinders 66 are retracted and the FIG. 10 position is achieved.

Figure 11:
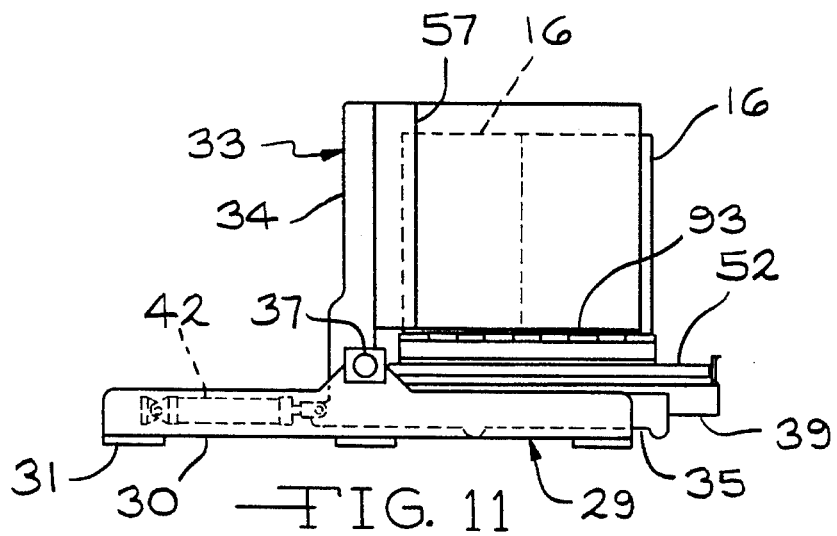
FIG. 11 is an elevational view of the upender assembly, shown in FIG. 6, and showing the deck and the rear carrier assembly pivoted 90° to position the rolls in a vertical position.

At this time, the main pivot cylinders 42 are actuated and the L-shaped support members 33 together with the deck 57, pallet 93 and rear carrier assembly 39 are rotated 90°, placing the rolls 16 in an upended vertical position, as shown in FIG. 11.

Figure 12:
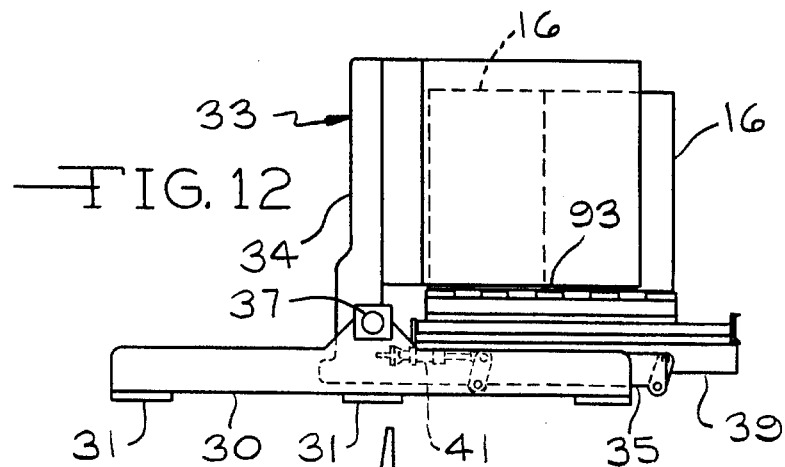
FIG. 12 is a view similar to FIG. 11 after extension of the pivot link cylinders and showing the pallet moved to the right, as shown in FIGS. 11 and 12.

The next step is to move the upended rolls 16 outwardly to a remote location where they are transported to another job site or transported to another location in the factory. To provide sufficient clearance, the link cylinders 41 are actuated. Acting through the links 40, the carrier assembly 39 which is now supporting the pallet 93 and the paper rolls 16 is moved outwardly relative to the legs 35, as shown in FIG. 12.

Figure 13:
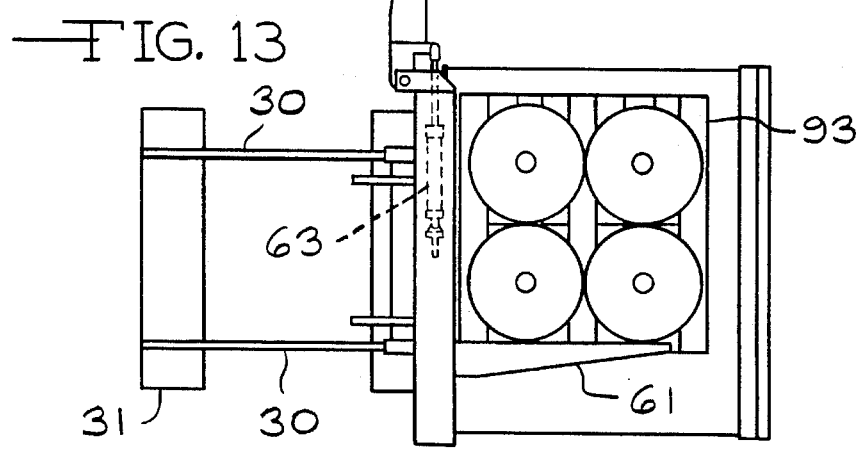
FIG. 13 is a top plan view of the upender assembly shown in FIG. 12 and showing the pivotal gate rotated outwardly.
Figure 14:
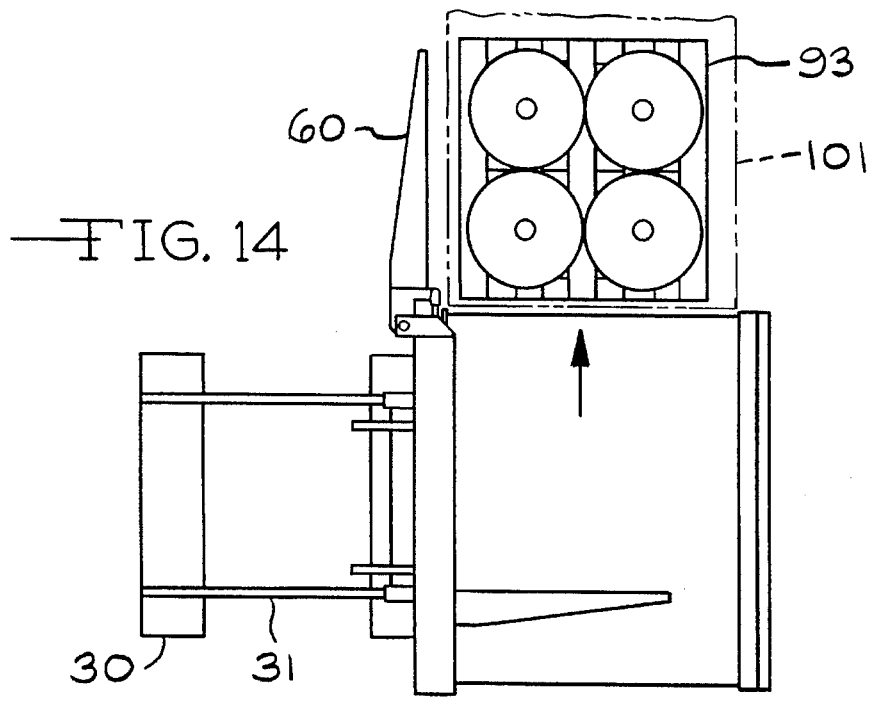
FIG. 14 is a view similar to FIG. 13 showing the pallet supporting the vertically aligned rolls moved outwardly away from the carrier assembly.

At this time, the gate cylinders 63 are extended and the gate 60 pivoted outwardly 90° to the FIG. 13 position.

The pallet 93, supporting the properly aligned and upended rolls 16, is moved outwardly by actuating the motor and gear reduction assembly 48. The drive rollers 52 begin to rotate and move the pallet 93 and rolls 16 to a conveyor 101. In other embodiments, not shown, the pallet 93 is moved outwardly and is handled by other conveying means, for example by a fork lift.

The pivot cylinders 63 are then retracted swinging the gate 60 inwardly. The link cylinders are actuated to move the carrier assembly inwardly. The main pivot cylinders 42 are actuated rotating the deck 57 and the rear carrier assembly 90° to the FIG. 6 position. The drive motor 76 is energized and reversed to move the carriage 68 to the right, as viewed in FIG. 2. This moves the movable gate 61 to its beginning position, as shown in FIG. 6. Another pallet 93 is positioned on the pallet deck 98 and the roll handling apparatus 15, including the tiltable upender assembly 21, is in position for another operation.

Many revisions may be made to the above preferred embodiment and to the following claims without departing from the scope of the invention.

I claim:

1. A roll handling apparatus comprising, a support rail, a C-hook assembly mounted for movement along said rail, said C-hook assembly including a travelling support mounted for movement on said rail, a vertically movable lifting arm extending downwardly from said travelling support and a C-shaped lifting hook mounted adjacent the lower end of said lifting arm, and a tiltable upender assembly adjacent said support rail, said C-shaped lifting hook supporting rolls for movement to said tiltable upender assembly, said upender assembly including a frame, a deck assembly having front, rear and opposing sides, opposed gates positioned adjacent said opposing sides of said deck assembly, a rear carrier assembly positioned adjacent said rear side and extending generally perpendicularly to said deck, a cylinder operatively connected to said deck assembly to rotate said deck assembly and said rear carrier 90 degrees relative to said frame about a first axis and a tilting cylinder operatively connected to said deck to tilt said deck assembly about a second axis, wherein the second axis is substantially perpendicular to the first axis.

2. A roll handling apparatus, according to claim 1, wherein one of said gates is pivotable between a first raised position and a second lowered position and wherein the other of said gates is movable toward and away from the opposed gate.

3. A roll handling apparatus, according to claim 1, including a carrier plate mounted adjacent said carrier assembly, said carrier plate supporting a pallet when said carrier assembly is in its vertical position and a pallet cylinder for vertically moving said carrier plate.

4. A roll handling apparatus, according to claim 3, including at least one return spring assembly attached to said carrier plate.

5. A roll handling apparatus according to claim 2, wherein said one of said gates is pivotally mounted to said deck assembly and a pair of pivot cylinders are operatively connected to said gate for pivoting said gate between the first position and the second position.

6. A roll handling apparatus, according to claim 2, wherein said other one of said gates includes end members, a carriage mounted for movement by said deck assembly, said end members being attached to said carriage.

7. A roll handling apparatus, according to claim 6, wherein said deck assembly includes a pair of guide plates which define a path, said carriage including a shaft having rollers mounted at its outer ends, said rollers being supported by said guide plates for movement along said path.

8. A roll handling apparatus, according to claim 7, including a motor a threaded shaft operatively connected to said motor and mounted within said deck assembly, a drive block having a threaded opening receiving said threaded shaft mounted on said carriage, whereby rotation of said threaded shaft moves said carriage along said path.

9. A roll handling apparatus, according to claim 6, including a pair of spaced racks mounted by said deck assembly adjacent said carriage and a pair of spaced pinions mounted for rotation on said carriage and mating with said spaced racks.

10. A roll handling apparatus, according to claim 1, including spaced L-shaped support members having perpendicular legs, wherein said pivotal rear carrier assembly is mounted on spaced ones of said legs by a plurality of links and at least one link cylinder for moving said carrier assembly relative to said spaced ones of said legs.

11. A roll handling apparatus, according to claim 1, wherein said carrier assembly mounts a plurality of spaced drive rollers and a drive motor operatively connected to said drive rollers.

12. A roll handling apparatus, according to claim 11, including a plurality of idler rollers mounted on said carrier assembly and generally interposed with said drive rollers.

13. A tiltable upender assembly comprising a frame, a deck assembly having front, rear and opposing sides, opposed gates positioned adjacent said opposing sides of said deck assembly, a rear carrier assembly positioned adjacent said rear side and extending generally perpendicularly to said deck assembly, a cylinder operatively connected to said deck assembly to rotate said deck assembly and said rear carrier 90 degrees relative to said frame about a first axis, and a tilting cylinder operatively connected to said deck to tilt said deck assembly about a second axis, wherein the second axis is substantially perpendicular to said first axis.

14. A tiltable upender assembly, according to claim 13, wherein one of said gates is pivotable between first and second positions and wherein the other of said gates is movable toward and away from said one of said gates.

15. A tiltable upender assembly, according to claim 13, including a carrier plate mounted adjacent said carrier assembly, said carrier plate supporting a pallet when said carrier assembly is in its vertical position, and a pallet cylinder for vertically moving said carrier plate.

16. A tiltable upender assembly, according to claim 15, including at least one return spring assembly attached to said carrier plate.

17. A tiltable upender assembly, according to claim 14, wherein said one of said gates is pivotally mounted to said deck assembly and a pair of pivot cylinders are operatively connected to said gate for pivoting said gate between the first and second positions.

18. A tiltable upender assembly, according to claim 14, wherein said other one of said gates includes end members, a carriage mounted for movement by said deck assembly, said end members being attached to said carriage.

19. A tiltable upender assembly, according to claim 18, wherein said deck assembly includes a pair of guide plates which define a path, said carriage including a shaft having rollers mounted at its outer ends, said rollers being supported by said guide plates for movement along said path.

20. A tiltable upender assembly, according to claim 19, including a motor, a threaded shaft operatively connected to said motor and mounted within said deck assembly, a drive block having a threaded opening receiving said threaded shaft mounted on said carriage, whereby rotation of said threaded shaft moves said carriage along said path.

21. A tiltable upender assembly, according to claim 18, including a pair of spaced racks mounted by said deck assembly adjacent said carriage and a pair of spaced pinions mounted for rotation on said carriage and mating with said spaced racks.

22. A tiltable upender assembly, according to claim 13, including spaced L-shaped support members having perpendicular legs, wherein said pivotal rear carrier assembly is mounted on spaced ones of said legs by a plurality of links and at least one link cylinder for moving said carrier assembly relative to said spaced ones of said legs.

23. A tiltable upender assembly, according to claim 13, wherein said carrier assembly mounts a plurality of spaced drive rollers and a drive motor operatively connected to said drive rollers.

24. A tiltable upender assembly, according to claim 23, including a plurality of idler rollers mounted on said carrier assembly and generally interposed with said drive rollers.

* * * * *